(12) United States Patent
Nukada et al.

(10) Patent No.: US 10,961,905 B2
(45) Date of Patent: Mar. 30, 2021

(54) ENGINE UPPER-PORTION STRUCTURE OF SADDLE RIDING VEHICLE

(71) Applicant: HONDA MOTOR CO., LTD., Tokyo (JP)

(72) Inventors: Yoshitaka Nukada, Wako (JP); Yutaka Inomoto, Wako (JP); Hitoshi Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 16/552,808

(22) Filed: Aug. 27, 2019

(65) Prior Publication Data

US 2020/0102883 A1    Apr. 2, 2020

(30) Foreign Application Priority Data

Sep. 27, 2018    (JP) .............................. JP2018-182716

(51) Int. Cl.

| B62K 11/06 | (2006.01) |
| F02B 61/02 | (2006.01) |
| F01P 3/02 | (2006.01) |
| F01P 7/16 | (2006.01) |
| F01M 13/04 | (2006.01) |
| F16D 25/00 | (2006.01) |

(Continued)

(52) U.S. Cl.
CPC .............. *F02B 61/02* (2013.01); *B62K 11/06* (2013.01); *B62M 7/02* (2013.01); *F01M 13/04* (2013.01); *F01P 3/02* (2013.01); *F01P 7/16* (2013.01); *F16D 25/00* (2013.01); *F01P 3/18* (2013.01); *F01P 11/04* (2013.01); *F01P 2003/182* (2013.01); *F01P 2050/16* (2013.01)

(58) Field of Classification Search
CPC .... F01P 1/02; F01P 1/04; B62K 11/04; B62K 11/06; B62K 11/08
See application file for complete search history.

(56) References Cited

U.S. PATENT DOCUMENTS 5,992,355 A * 11/1999 Shichinohe ............. F02B 61/02
123/195 AC
7,152,590 B2 * 12/2006 Samo ................. F01M 13/0416
123/572

(Continued)

FOREIGN PATENT DOCUMENTS

| CN | 106536887 A | 3/2017 |
| JP | 5675467 | 2/2015 |

(Continued)

OTHER PUBLICATIONS

Japanese Office Action dated Jun. 30, 2020, English translation included, 7 pages.
Indian Office Action dated Dec. 31, 2020, 5 pages.

*Primary Examiner* — Jeffrey J Restifo
(74) *Attorney, Agent, or Firm* — Rankin, Hill & Clark LLP

(57) ABSTRACT

In an engine, a cylinder block and a cylinder head are connected with a crankcase in a forwardly inclined posture. A dual clutch connects or disconnects a transmission path of power of the engine to a transmission. An actuator chamber houses an actuator that controls a hydraulic pressure of the dual clutch. The actuator chamber is disposed on an upper surface of the cylinder block at a position posterior to the cylinder head and anterior to the crankcase in a vehicle longitudinal direction.

5 Claims, 7 Drawing Sheets

(51) Int. Cl.
  *B62M 7/02*  (2006.01)
  *F01P 3/18*  (2006.01)
  *F01P 11/04*  (2006.01)

(56) References Cited

U.S. PATENT DOCUMENTS

| | | | |
|---|---|---|---|
| 7,174,984 B2* | 2/2007 | Kosugi | B62J 27/00 |
| | | | 180/219 |
| 7,575,083 B2* | 8/2009 | Kosugi | B62K 11/04 |
| | | | 180/219 |
| 7,926,636 B2* | 4/2011 | Ogasawara | F16D 13/683 |
| | | | 192/48.611 |
| 8,375,905 B2* | 2/2013 | Sato | F02B 67/06 |
| | | | 123/90.16 |
| 8,448,740 B2* | 5/2013 | Inui | F16H 63/18 |
| | | | 180/292 |
| 8,770,160 B2* | 7/2014 | Maehara | F16D 21/06 |
| | | | 123/90.12 |
| 8,857,285 B2* | 10/2014 | Fujimoto | F16H 3/006 |
| | | | 74/331 |
| 8,944,228 B2* | 2/2015 | Fukaya | F16D 21/06 |
| | | | 192/48.614 |
| 8,950,560 B2* | 2/2015 | Mizuno | F16D 23/12 |
| | | | 192/20 |
| 9,074,673 B2* | 7/2015 | Mizuno | F16H 59/02 |
| 9,086,132 B2* | 7/2015 | Adachi | F16H 63/14 |
| 9,091,308 B2* | 7/2015 | Ogasawara | F16D 21/06 |
| 9,772,034 B2* | 9/2017 | Chiba | F01M 11/0004 |
| 10,167,908 B2* | 1/2019 | Mizuno | F16D 48/04 |
| 10,677,151 B2* | 6/2020 | Kuroiwa | B62M 7/02 |
| 10,683,052 B2* | 6/2020 | Sugiyama | B62K 11/04 |
| 10,718,424 B2* | 7/2020 | Takahashi | F16H 63/14 |
| 10,843,762 B2* | 11/2020 | Yamamoto | B62K 19/30 |

FOREIGN PATENT DOCUMENTS

| | | |
|---|---|---|
| JP | 2018-140705 | 9/2018 |
| KR | 101601236 B1 | 3/2016 |

* cited by examiner

ENGINE UPPER-PORTION STRUCTURE OF SADDLE RIDING VEHICLE

INCORPORATION BY REFERENCE

The present application claims priority under 35 U.S.C. § 119 to Japanese Patent Application No. 2018-182716 filed on Sep. 27, 2018. The content of the application is incorporated herein by reference in its entirety.

TECHNICAL FIELD

The present invention relates to an engine upper-portion structure of a saddle riding vehicle.

BACKGROUND ART

A hitherto known structure includes an actuator, disposed on an engine side surface, for controlling a hydraulic clutch of a forwardly inclined engine (see, for example, Patent Document 1).

PRIOR ART DOCUMENT

Patent Document

[Patent Document 1]
Japanese Patent No. 5675467

SUMMARY OF THE INVENTION

Problem to be Solved by the Invention

The structure disclosed in Patent Document 1 includes an actuator chamber disposed on the engine side surface, which poses a problem of an increased size of the vehicle in a vehicle width direction.

It is therefore an object of the present invention to provide an engine upper-portion structure of a saddle riding vehicle, capable of preventing an increase in size of a vehicle in a vehicle width direction even with a similar actuator disposed for controlling a hydraulic clutch.

Means for Solving the Problem

To achieve the foregoing object, an aspect of the present invention provides an engine upper-portion structure of a saddle riding vehicle, including: a forwardly inclined engine (33) including a cylinder block (51, 51A) and a cylinder head (52) connected in a forwardly inclined posture with a crankcase (44); a hydraulic clutch (131, 132) that connects or disconnects a transmission path of power of the forwardly inclined engine (33) to a transmission (47); and an actuator chamber (197) that houses an actuator (196) for controlling a hydraulic pressure of the hydraulic clutch (131, 132). In engine upper-portion structure of the saddle riding vehicle, the actuator chamber (197) is disposed on an upper surface of the cylinder block (51, 51A) at a position posterior to the cylinder head (52) and anterior to the crankcase (44) in a vehicle longitudinal direction.

In the foregoing configuration, preferably, the engine upper-portion structure further includes a breather chamber (198, 206) disposed on an upper surface of the crankcase (44) or an upper surface of the cylinder block (51, 51A), the breather chamber (198, 206) performing gas-liquid separation of breathing air in the crankcase (44). In the engine upper-portion structure, the breather chamber (198, 206) is adjacent to the actuator chamber (197) and the breather chamber (198, 206) and the actuator chamber (197) are closed by a single lid member (81).

In the foregoing configuration, preferably, the cylinder block (51, 51A) and/or the cylinder head (52) are cooled by a coolant, a thermostat (95) and a thermostat case (94) are disposed midway in a water path of the coolant, the thermostat (95) changing the water path of the coolant depending on a temperature of the coolant and the thermostat case (94) housing the thermostat (95), and the thermostat case (94) is integrated with a lid member (81) of the actuator chamber (197).

In the foregoing configuration, preferably, the cylinder block (51, 51A) and/or the cylinder head (52) are cooled by a coolant, a thermostat (95) and a thermostat case (94) are disposed midway in a water path of the coolant, the thermostat (95) changing the water path of the coolant depending on a temperature of the coolant and the thermostat case (94) housing the thermostat (95), the thermostat case (94) is integrated with the lid member (81), and a connecting water path (199, 207) is disposed adjacent to the breather chamber (198, 206), the connecting water path (199, 207) connecting a water path in the cylinder block (51) and/or the cylinder head (52) with the thermostat case (94).

In the foregoing configuration, preferably, a part of the connecting water path (199) is disposed adjacent to the actuator chamber (197).

Effects of the Invention

In the engine upper-portion structure of the saddle riding vehicle, the actuator chamber is disposed on the upper surface of the cylinder block at a position posterior to the cylinder head and anterior to the crankcase in a vehicle longitudinal direction. An increase in size of the engine in the vehicle width direction can thus be prevented. Additionally, an effect on the actuator chamber from, for example, flying gravel can be reduced.

In the foregoing configuration, the breather chamber that performs gas-liquid separation of the breathing air in the crankcase 44 is formed on the upper surface of the crankcase or the upper surface of the cylinder block. The breather chamber is adjacent to the actuator chamber and the breather chamber and the actuator chamber are closed by the single lid member. Thus, the actuator chamber and the breather chamber can be hermetically sealed by the single lid member. Thus, reduction can be achieved in the number of man-hours, as in machining a packing surface, and the number of parts used.

In the foregoing configuration, the cylinder block and/or the cylinder head are cooled by the coolant and the thermostat and the thermostat case are disposed midway in a water path of the coolant. The thermostat changes the water path of the coolant depending on the temperature of the coolant. The thermostat case houses the thermostat. The thermostat case is integrated with the lid member. Reduction in the number of parts used can thus be promoted.

In the foregoing configuration, the cylinder block and/or the cylinder head are cooled by the coolant and the thermostat and the thermostat case are disposed midway in the water path of the coolant. The thermostat changes the water path of the coolant depending on the temperature of the coolant. The thermostat case houses the thermostat. The thermostat case is integrated with the lid member. The connecting water path that connects a water path in the cylinder block and/or the cylinder head with the thermostat case is disposed adjacent to the breather chamber. Because of the connecting water path being disposed adjacent to the breather chamber, the breather chamber may serve as a simplified heat exchanger that can reduce a high temperature of the coolant. In addition, the single engine cover can function as a lid for the breather chamber, a lid for the actuator chamber, and the thermostat case, so that the number of parts used can be reduced.

In the foregoing configuration, a part of the connecting water path is disposed adjacent to the actuator chamber. Thus, when the temperature of oil in the actuator chamber is high, the coolant may function as receiving the heat, so that the temperature of oil in the actuator chamber can be prevented from rising inordinately.

MODES FOR CARRYING OUT THE INVENTION

Figure 1:
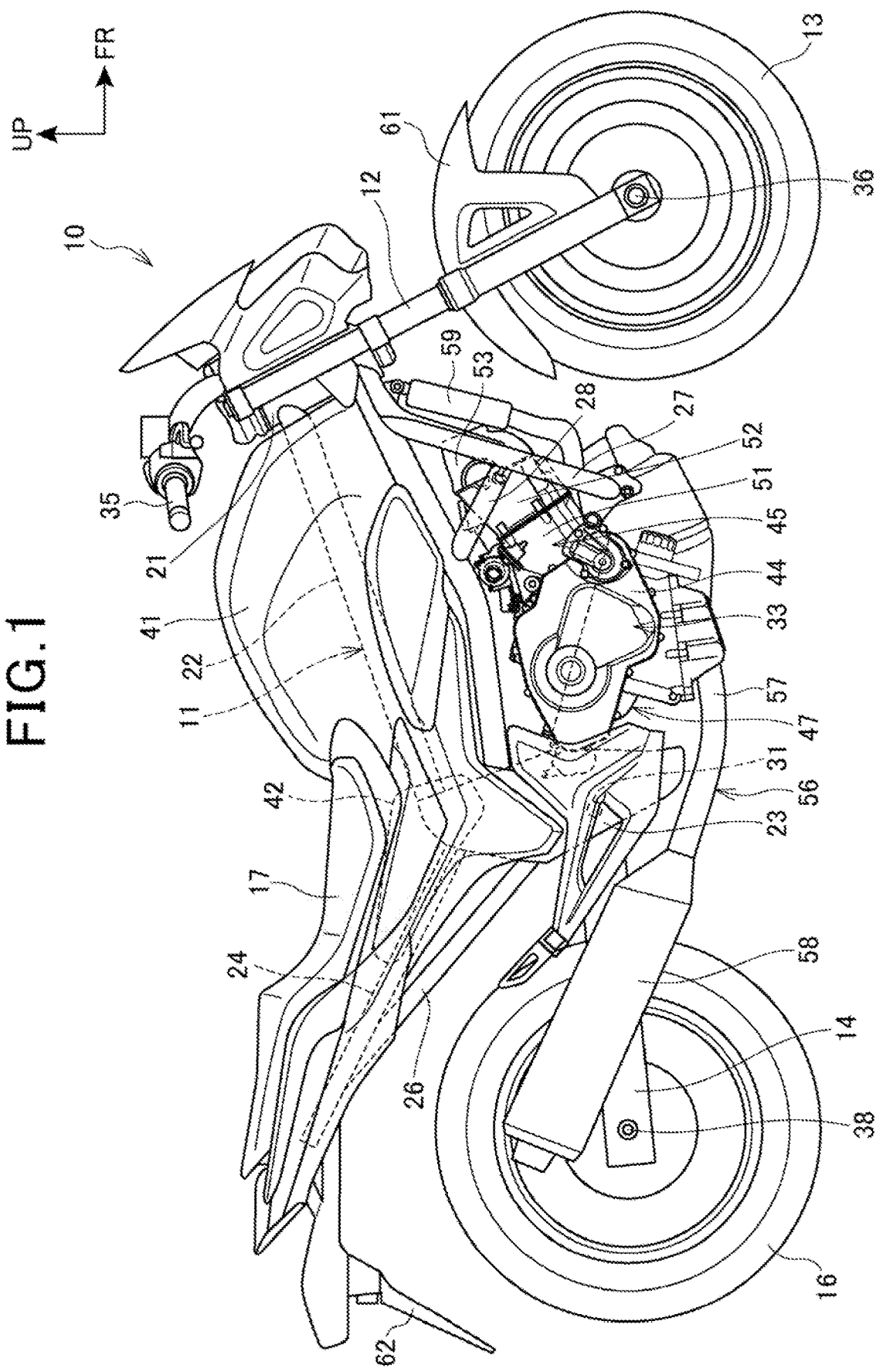
FIG. 1 is a right side elevation view of a motorcycle on which an engine according to a first embodiment of the present invention is mounted.

Specific embodiments to which the present invention is applied will be described below with reference to the accompanying drawings. Throughout the descriptions given hereunder, expressions indicating directions including front and rear, right and left, and upper and lower are identical to directions relative to a vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

First Embodiment

FIG. 1 is a right side elevation view of a motorcycle 10 on which an engine 33 according to a first embodiment of the present invention is mounted.

The motorcycle 10 includes a vehicle body frame 11, a front wheel 13, a rear wheel 16, and a seat 17. The vehicle body frame 11 constitutes a framework. The front wheel 13 is supported at a front end portion of the vehicle body frame 11 via a front fork 12. The rear wheel 16 is supported at a lower portion of the vehicle body frame 11 via a swing arm 14. The seat 17 provides a place in which an occupant sits.

The motorcycle 10 is a saddle riding vehicle in which the occupant straddles the seat 17.

The vehicle body frame 11 includes a head pipe 21, a pair of left and right main frames 22, a center frame 23, a pair of left and right seat frames 24, a pair of left and right sub-frames 26, a pair of left and right down frames 27, and a pair of left and right reinforcement frames 28.

The head pipe 21 constitutes the front end portion of the vehicle body frame 11 and rotatably supports the front fork 12. The left and right main frames 22 are each composed of a pair of upper and lower frame members and extend obliquely downwardly toward the rear from the head pipe 21. The center frame 23 extends downwardly from rear ends of the left and right main frames 22. The center frame 23 includes a pivot shaft 31. The pivot shaft 31 extends in a vehicle width direction. The swing arm 14 is vertically swingably supported on the pivot shaft 31.

The left and right seat frames 24 extend from upper portions of the center frame 23 upwardly toward the rear to thereby support the seat 17. The left and right sub-frames 26 connect the center frame 23 with the respective seat frames 24. The left and right down frames 27 extend obliquely downwardly toward the rear from respective front portions of the main frames 22. The left and right down frames 27, together with the left and right main frames 22 and the center frame 23, support the engine 33. The left and right reinforcement frames 28 connect the respective main frames 22 with the respective down frames 27.

A handlebar 35 is mounted on an upper portion of the front fork 12. The front wheel 13 is supported at a lower end portion of the front fork 12 via an axle 36.

The rear wheel 16 is supported at a rear end portion of the swing arm 14 via an axle 38. A luggage box 41 on the left and right main frames 22 at a position anterior to the seat 17. A fuel tank 42 is disposed inferior to the seat 17.

The engine 33 includes a crankcase 44 and a cylinder portion 45. The crankcase 44 houses a crankshaft. The cylinder portion 45 extends obliquely upwardly toward to the front of the vehicle from an upper portion of a front portion of the crankcase 44. A transmission 47 is integrated with a rear portion of the crankcase 44.

The cylinder portion 45 includes a cylinder block 51, a cylinder head 52, and a head cover 53. The cylinder block 51, the cylinder head 52, and the head cover 53 are disposed in juxtaposition with each other in sequence from the side of the crankcase 44.

An intake device is connected with an upper surface of the cylinder head 52. An exhaust device 56 is connected with a lower surface of the cylinder head 52. The exhaust device 56 includes an exhaust pipe 57 and a muffler 58. The exhaust pipe 57 extends from a lower surface of the cylinder head 52 posteriorly along the vehicle. The muffler 58 is connected with a rear end portion of the exhaust pipe 57. A radiator 59, which cools the engine 33, is disposed anterior to the head cover 53.

The front wheel 13 is covered in a front fender 61 from above. The rear wheel 16 is covered in a rear fender 62 from above.

Figure 2:
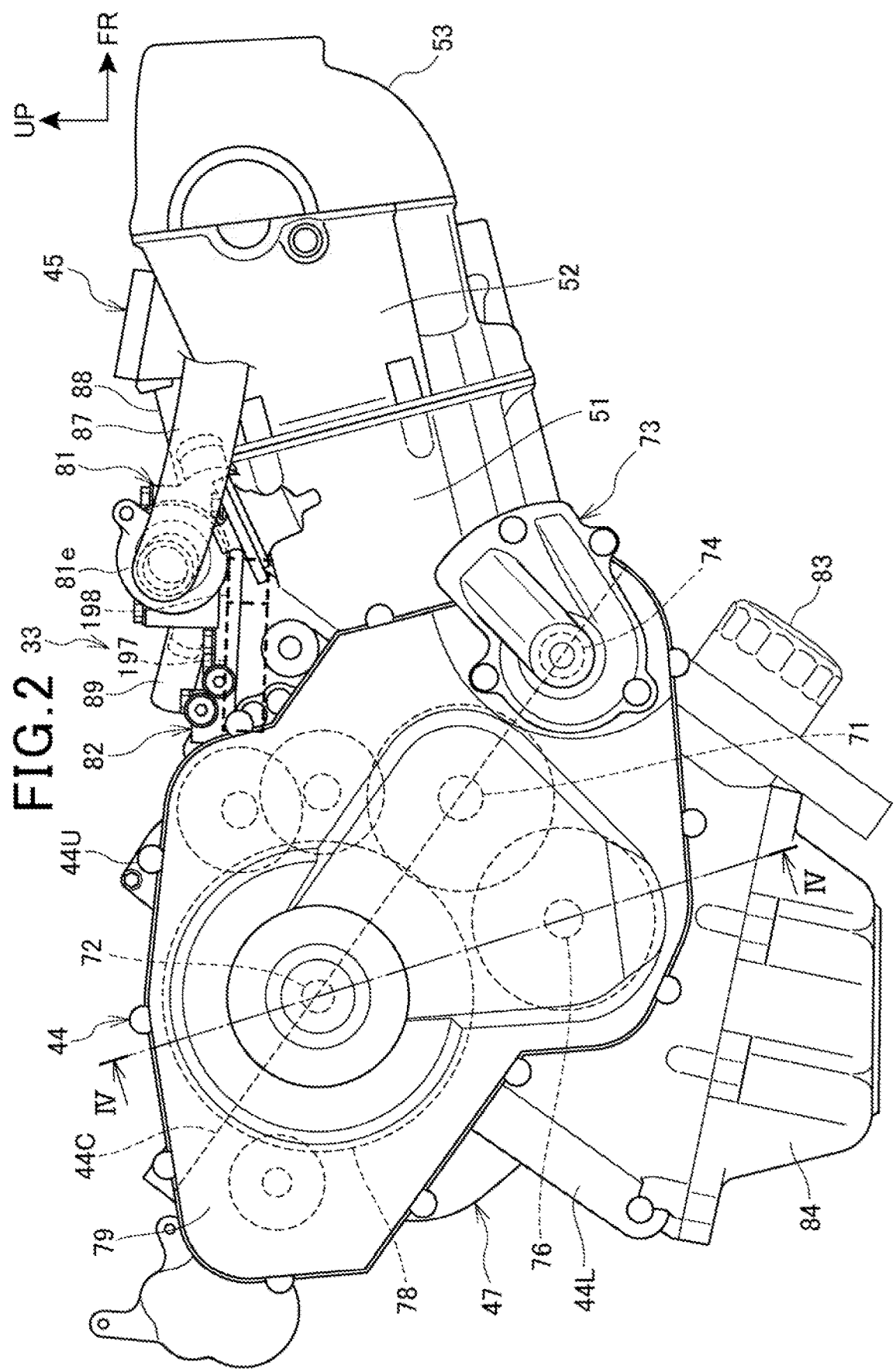
FIG. 2 is a right side elevation view of the engine.

FIG. 2 is a right side elevation view of the engine 33.

The crankcase 44 of the engine 33 is vertically divided and includes an upper case 44U and a lower case 44L. A crankshaft 71, a main shaft 72, and an oil pump shaft 74 are clamped between, and supported by, the upper case 44U and the lower case 44L along a faying surface 44C between the upper case 44U and the lower case 44L. The main shaft 72 constitutes a part of the transmission 47. The oil pump shaft 74 serves as a rotational shaft of an oil pump 73. A counter shaft 76, which constitutes a part of the transmission 47, is disposed inferior to, and spaced apart from, the faying surface 44C.

A hydraulically driven dual clutch 78 is disposed at an end portion closer to the viewer of the main shaft 72.

A crank case cover 79 is mounted on side surfaces of the upper case 44U and the lower case 44L. The crank case cover 79 covers from a side of the vehicle a plurality of shafts including the crankshaft 71, the main shaft 72, the oil pump shaft 74, and the counter shaft 76 mentioned previously.

The cylinder portion 45 is inclined upwardly toward the front. An upper portion (specifically, an upper surface) of the cylinder block 51 has an engine upper-portion recess (not illustrated) composed of a plurality of recesses. An engine cover 81, which covers the engine upper-portion recess, is mounted on the cylinder block 51. The engine upper-portion recess and the engine cover 81 form an engine upper-portion chamber 82.

The engine upper-portion chamber 82 is disposed anterior in the vehicle to the crankcase 44 and posterior in the vehicle to the cylinder head 52.

An oil filter 83 is mounted at a front portion of the crankcase 44 and an oil pan 84 is mounted at a lower portion of the crankcase 44.

Figure 3:
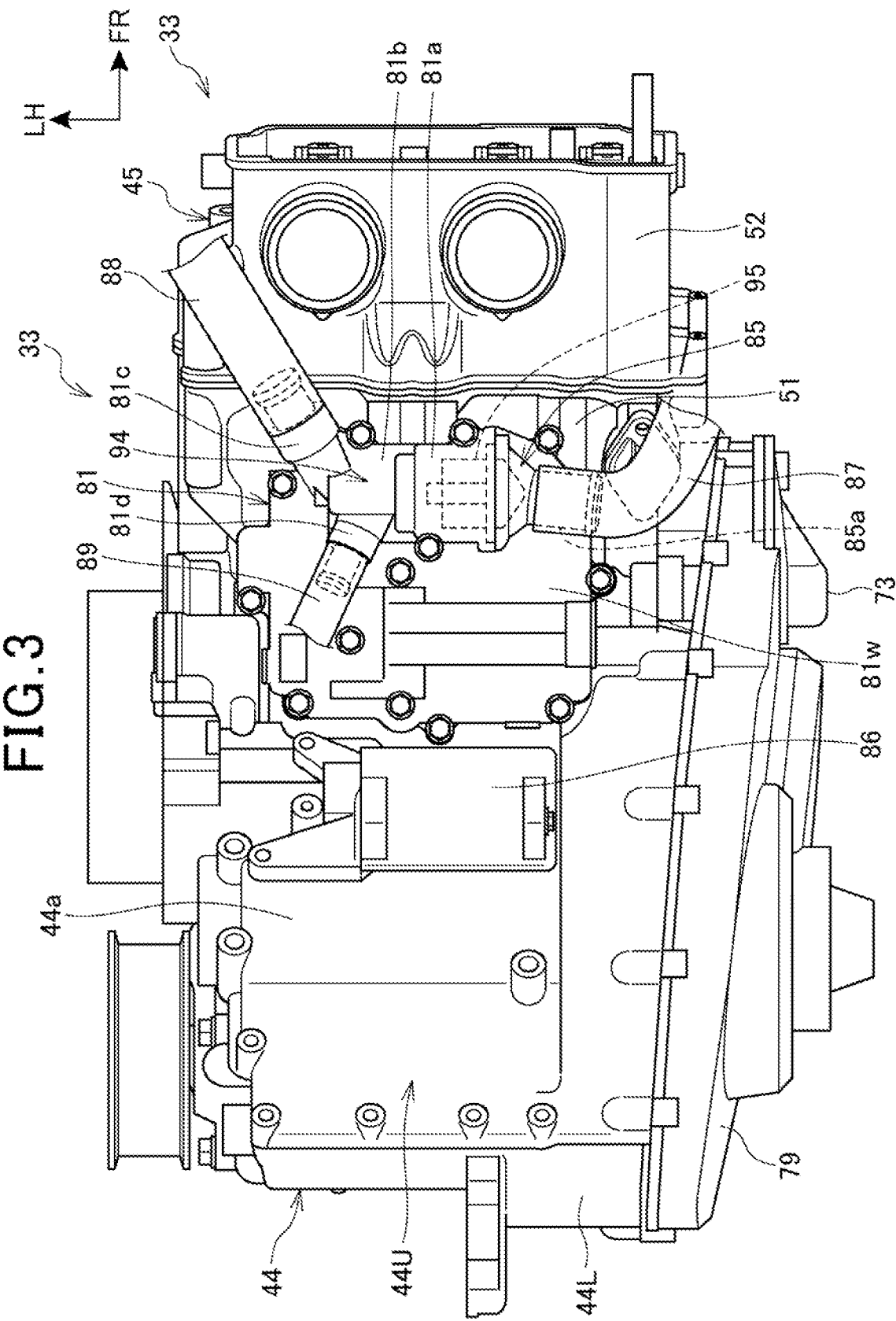
FIG. 3 is a plan view of the engine.

FIG. 3 is a plan view of the engine 33.

The crankcase 44 (specifically, the upper case 44U) has a recess 44a formed in an upper portion of the crankcase 44. A starter motor 86 is disposed in the recess 44a. The engine cover 81, which is mounted on the upper portion of the cylinder block 51, is disposed anterior in the vehicle to the starter motor 86.

The engine cover 81 has an upper surface 81w. The engine cover 81 includes a thermostat housing pipe portion 81a, an extended portion 81b, and a plurality of tubular branch pipe portions 81c and 81d. The thermostat housing pipe portion 81a is formed into a tube. The extended portion 81b extends from the thermostat housing pipe portion 81a. The branch pipe portions 81c and 81d branch from the extended portion 81b. The thermostat housing pipe portion 81a, the extended portion 81b, and the branch pipe portions 81c and 81d are integrally formed on the upper surface 81w.

A thermostat housing portion cover 85, which is provided with a hose connection port 85a, is mounted on an end opening in the thermostat housing pipe portion 81a. A hose 87 is connected with the hose connection port 85a of the thermostat housing portion cover 85. Hoses 88 and 89 are connected with the branch pipe portions 81c and 81d, respectively. Hoses 87 and 88 are connected with the radiator 59 (see FIG. 1). The hose 89 is connected with the side of the cylinder portion 45.

The thermostat housing pipe portion 81a and the thermostat housing portion cover 85 constitute a thermostat case 94. A thermostat 95 is housed in the thermostat case 94. An inside of the thermostat case 94 communicates with a water passage 199 (see FIG. 6), through which coolant flows.

The thermostat 95 is opened or closed depending on a coolant temperature such that a flow rate of coolant flowing from the cylinder block 51 and the cylinder head 52 to the radiator 59 is varied to thereby bring the coolant temperature into a predetermined range.

Figure 4:
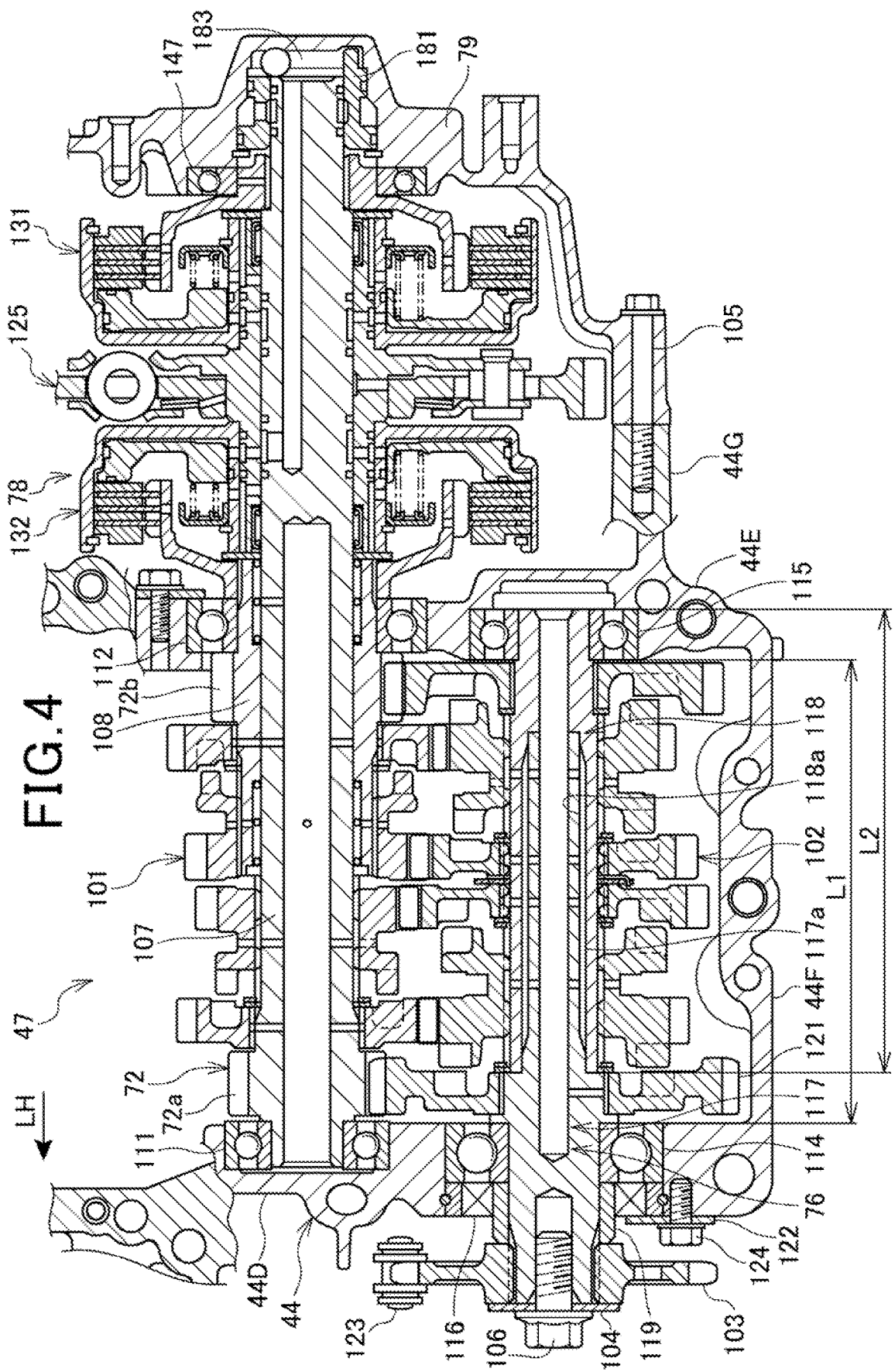
FIG. 4 is a cross-sectional view taken along line IV-IV in FIG. 2.
Figure 5:
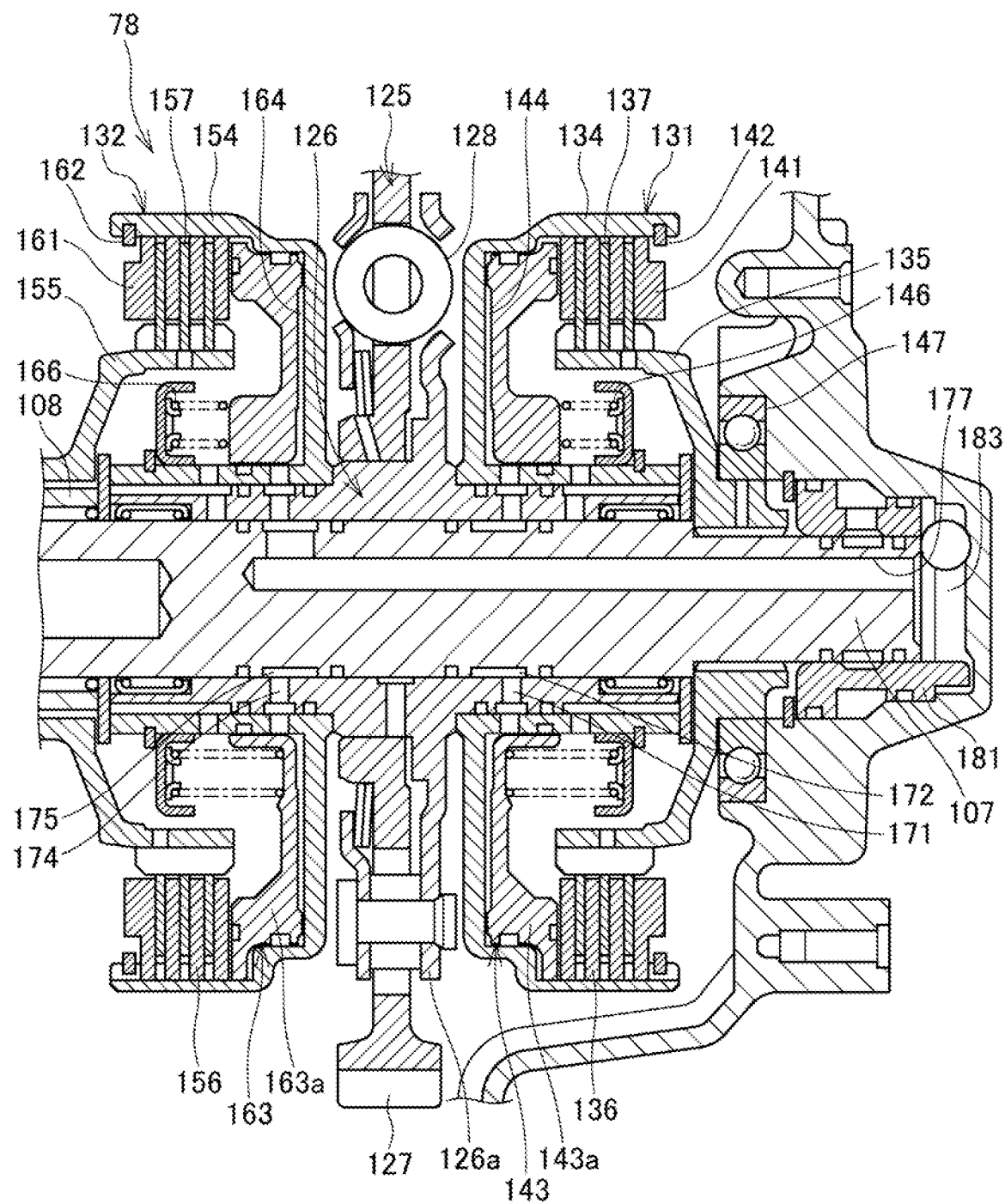
FIG. 5 is an enlarged cross-sectional view of a dual clutch illustrated in FIG. 4.

FIG. 4 is a cross-sectional view taken along line IV-IV in FIG. 2. FIG. 5 is an enlarged cross-sectional view of the dual clutch 78 illustrated in FIG. 4.

As illustrated in FIG. 4, the transmission 47 includes the main shaft 72, the counter shaft 76, a main shaft transmission gear group 101, a counter shaft transmission gear group 102, and an output sprocket 103.

The main shaft 72 and the counter shaft 76 are disposed in the crankcase 44 in parallel with the crankshaft 71 (see FIG. 2).

The crankcase 44 includes a left wall 44D, a right wall 44E, and a rear wall 44F. The left wall 44D serves as a lateral wall on a first side. The right wall 44E serves as a lateral wall on a second side. The rear wall 44F connects rear edges of the left wall 44D and the right wall 44E. The left wall 44D, the right wall 44E, and the rear wall 44F are integrated with each other. A protruding wall 44G, which protrudes to a side of the vehicle, is integrally formed with the right wall 44E. The crank case cover 79 is attached to an end portion of the protruding wall 44G by a plurality of bolts 105.

An inside dimension between the left wall 44D and the right wall 44E is L1.

The main shaft 72 includes a first main shaft 107 and a tubular second main shaft 108. The first main shaft 107 has a first end portion disposed on the side of the left wall 44D of the crankcase 44 and a second end portion disposed to be spaced away laterally with respect to the right wall 44E. The second main shaft 108 is fitted over an intermediate portion in a longitudinal direction of the first main shaft 107 relatively rotatably and axially immovably.

The first main shaft 107 has the first end portion supported by a bearing 111, which is disposed in the left wall 44D. The second main shaft 108 is supported by a bearing 112, which is disposed in the right wall 44E.

The counter shaft 76 is rotatably supported by a bearing 114, which is disposed in the left wall 44D, and a bearing 115, which is disposed in the right wall 44E. The counter shaft 76 is a dual shaft including an inner shaft 117 and an outer shaft 118. The inner shaft 117 is supported by the bearing 114. The outer shaft 118 is supported by the bearing 115 and disposed outside the inner shaft 117.

The inner shaft 117 has male splines 117a on an outer peripheral surface of the inner shaft 117. The outer shaft 118 has female splines 118a on an inner peripheral surface of the outer shaft 118. The female splines 118a are connected through a splined connection with the male splines 117a of the inner shaft 117.

The main shaft transmission gear group 101 is disposed on the main shaft 72. The main shaft transmission gear group 101 includes transmission gears that are connected through, for example, a splined connection with the main shaft 72 and transmission gears integrally formed with the main shaft 72, for example, transmission gears 72a and 72b, which are disposed outermost ends of the main shaft transmission gear group 101. For example, the transmission gear 72a is a first-speed transmission gear and the transmission gear 72b is a second-speed transmission gear.

The counter shaft transmission gear group 102 is disposed on the counter shaft 76 and meshes with the main shaft transmission gear group 101.

The counter shaft transmission gear group 102 is mounted on the counter shaft 76 through, for example, a splined connection. A transmission gear 121, which is disposed farthest to the first side (leftmost side) out of the gears in the counter shaft transmission gear group 102, is engaged through a splined connection with the inner shaft 117. The other transmission gears in the counter shaft transmission gear group 102 are mounted on the outer shaft 118. The transmission gear 121 is a first-speed transmission gear in mesh with the transmission gear 72a on the main shaft 72 and is supported by the inner shaft 117 between the left wall 44D of the crankcase 44 and a first end portion (left end portion) of the outer shaft 118.

Let L2 denote a length of the outer shaft 118. Then, the length L2 is shorter than the inside dimension L1 of the crankcase 44 (L2<L1).

The counter shaft 76 constitutes an output shaft on which the output sprocket 103 is mounted. The output sprocket 103 is engaged through a splined connection with an end of the inner shaft 117 and fastened by a bolt 106 via a washer 104. A chain 123 is wound around the output sprocket 103 and a driven sprocket mounted on the rear wheel 16 (see FIG. 1). Thereby, power is transmitted from the transmission 47 to the rear wheel 16.

The following steps are to be performed to mount the counter shaft 76 in the first embodiment in the crankcase 44.

The bearing 114, a sealing member 116, a collar 119, and the output sprocket 103 are mounted in advance on the end of the inner shaft 117. All of the transmission gears of the counter shaft transmission gear group 102, but the transmission gear 121, are mounted in advance on the outer shaft 118.

Place the sub-assembled outer shaft 118 between the left wall 44D and the right wall 44E of the crankcase 44 so as to extend in the vehicle width direction or substantially in the vehicle width direction. Then, fit a second end portion (right end portion) of the outer shaft 118 in the bearing 115, which is mounted in the right wall 44E.

Dispose the transmission gear 121 at a position between the left wall 44D and the first end portion (left end portion) of the outer shaft 118.

Insert the sub-assembled inner shaft 117 into a hole formed in the left wall 44D (hole drilled in order to mount the bearing 114 and the sealing member 116) and, along the female splines in the transmission gear 121 and the female splines 118a in the outer shaft 118, in sequence.

As a final step, lock the sealing member 116 by a lock piece 122 and a bolt 124.

As illustrated in FIGS. 4 and 5, the dual clutch 78 is mounted on portions of the first main shaft 107 and the second main shaft 108 disposed on the side of the protruding wall 44G relative to the right wall 44E of the crankcase 44.

A clutch damper mechanism 125 is disposed inside the dual clutch 78. The clutch damper mechanism 125 absorbs variations in torque generated in the crankshaft (see FIG. 2) to thereby prevent variations in torque from being readily transmitted to the side of the dual clutch 78.

The clutch damper mechanism 125 includes a transmission cylinder member 126, a damper gear 127, and a plurality of compression coil springs 128.

The transmission cylinder member 126 includes a flange-shaped assembly 126a. The flange-shaped assembly 126a is supported relatively rotatably and axially immovably on the first main shaft 107 and extends from a cylindrical central portion side outwardly in a radial direction to thereby be disposed on both sides of the damper gear 127. The damper gear 127 is supported relatively rotatably on the central portion of the transmission cylinder member 126. The damper gear 127 meshes with a drive gear provided on the crankshaft 71, so that power is transmitted from the crankshaft 71 to the transmission cylinder member 126. The compression coil springs 128 are disposed to be sandwiched circumferentially between the flange-shaped assembly 126a of the transmission cylinder member 126 and the damper gear 127.

A first hydraulic clutch 131 and a second hydraulic clutch 132 are disposed on respective lateral sides of the clutch damper mechanism 125.

The first hydraulic clutch 131 can connect or disconnect power between the transmission cylinder member 126 and the first main shaft 107 and is disposed on the first main shaft 107.

The second hydraulic clutch 132 can connect or disconnect power between the transmission cylinder member 126 and the second main shaft 108 and is disposed on the second main shaft 108.

The first hydraulic clutch 131 includes a first clutch outer 134, a first clutch inner 135, a plurality of first drive friction plates 136, a plurality of first driven friction plates 137, a first pressure receiving plate 141, a first retaining ring 142, a first piston 143, a first hydraulic chamber 144, and a first clutch spring 146.

The first clutch outer 134 is formed into a cup shape opening in a direction opposite to the clutch damper mechanism 125 and is coupled with the transmission cylinder member 126 relatively unrotatably. The first clutch inner 135 is coupled with the first main shaft 107 relatively unrotatably. The first drive friction plates 136 are engaged with the first clutch outer 134 axially movably and relatively unrotatably. The first driven friction plates 137 are disposed alternately with the first drive friction plates 136 and are engaged with the first clutch inner 135 axially movably and relatively unrotatably.

The first pressure receiving plate 141 is a ring-shaped member facing the outermost friction plate out of the alternating first drive friction plates 136 and the first driven friction plates 137. The first retaining ring 142 can be engaged with the first pressure receiving plate 141 from a side opposite to the first drive friction plates 136 and the first driven friction plates 137 and is mounted in the first clutch outer 134.

The first piston 143 includes a pressing portion 143a on an outer peripheral portion of the first piston 143. The pressing portion 143a clamps the first drive friction plates 136 and the first driven friction plates 137 up against the first pressure receiving plate 141. The first piston 143 is thereby liquid-tightly and slidably fitted in the first clutch outer 134. The first piston 143 forms the first hydraulic chamber 144 in a space across the first clutch outer 134. The first clutch spring 146 urges the first piston 143 toward a side in which the first hydraulic chamber 144 has a reduced volume.

A ball bearing 147 is disposed between the first clutch inner 135 and the crank case cover 79.

Specifically, the first main shaft 107 has an end portion (right end portion) rotatably supported by the crank case cover 79 via the first clutch inner 135.

The first hydraulic clutch 131 is in a clutch off state in which power transmission is shut off under a condition in which hydraulic pressure does not act on the first hydraulic chamber 144. The first hydraulic clutch 131 is brought into a clutch on state under a condition in which the hydraulic pressure acts on the first hydraulic chamber 144, in which the first hydraulic clutch 131 transmits power transmitted from the crankshaft 71 to the first clutch outer 134 via the clutch damper mechanism 125 to the first main shaft 107.

The second hydraulic clutch 132 includes a second clutch outer 154, a second clutch inner 155, a plurality of second drive friction plates 156, a plurality of second driven friction plates 157, a second pressure receiving plate 161, a second retaining ring 162, a second piston 163, a second hydraulic chamber 164, and a second clutch spring 166.

The second clutch outer 154 is formed into a cylindrical shape opening in a direction toward the side of the crankcase 44 and is coupled with the transmission cylinder member 126 relatively unrotatably. The second clutch inner 155 is coupled with the second main shaft 108 relatively unrotatably. The second drive friction plates 156 are engaged with the second clutch outer 154 axially movably and relatively unrotatably. The second driven friction plates 157 are disposed alternately with the second drive friction plates 156 and are engaged with the second clutch inner 155 axially movably and relatively unrotatably.

The second pressure receiving plate 161 is a ring-shaped member facing the outermost friction plate out of the alternating second drive friction plates 156 and the second driven friction plates 157. The second retaining ring 162 can be engaged with the second pressure receiving plate 161 from a side opposite to the second drive friction plates 156 and the second driven friction plates 157 and is mounted in the second clutch outer 154.

The second piston 163 includes a pressing portion 163a on an outer peripheral portion of the second piston 163. The pressing portion 163a clamps the second drive friction plates 156 and the second driven friction plates 157 up against the second pressure receiving plate 161. The second piston 163 is thereby liquid-tightly and slidably fitted in the second clutch outer 154. The second piston 163 forms the second hydraulic chamber 164 in a space across the second clutch outer 154. The second clutch spring 166 urges the second piston 163 toward a side in which the second hydraulic chamber 164 has a reduced volume.

The second hydraulic clutch 132 is in a clutch off state in which power transmission is shut off under a condition in which hydraulic pressure does not act on the second hydraulic chamber 164. The second hydraulic clutch 132 is brought into a clutch on state under a condition in which the hydraulic pressure acts on the second hydraulic chamber 164, in which the second hydraulic clutch 132 transmits power transmitted from the crankshaft 71 to the second clutch outer 154 via the clutch damper mechanism 125 to the second main shaft 108.

A first oil passage 171, which communicates with the first hydraulic chamber 144, is provided for the first clutch outer 134 of the first hydraulic clutch 131 and the transmission cylinder member 126. A first annular recess 172, which communicates with the first oil passage 171, is formed in an outer periphery of the first main shaft 107.

A second oil passage 174, which communicates with the second hydraulic chamber 164, is provided for the second clutch outer 154 of the second hydraulic clutch 132 and the transmission cylinder member 126. A second annular recess 175, which communicates with the second oil passage 174, is formed in an outer periphery of the first main shaft 107.

An axial oil passage, not illustrated, and an axial oil passage 177 are formed in the end portion (right end portion) of the first main shaft 107. The axial oil passage and the axial oil passage 177 each have an inner end closed and each extend axially.

The axial oil passage, not illustrated, communicates with the first hydraulic chamber 144 via the first annular recess 172 and the first oil passage 171. The axial oil passage 177 communicates with the second hydraulic chamber 164 via the second annular recess 175 and the second oil passage 174.

The first main shaft 107 has the end portion (right end portion) fitted liquid-tightly in a cylindrical member 181. The cylindrical member 181 is fitted and fixed in the crank case cover 79. An oil chamber 183, which communicates with the axial oil passage 177, is formed between the first main shaft 107 and the cylindrical member 181, and the crank case cover 79.

Figure 6:
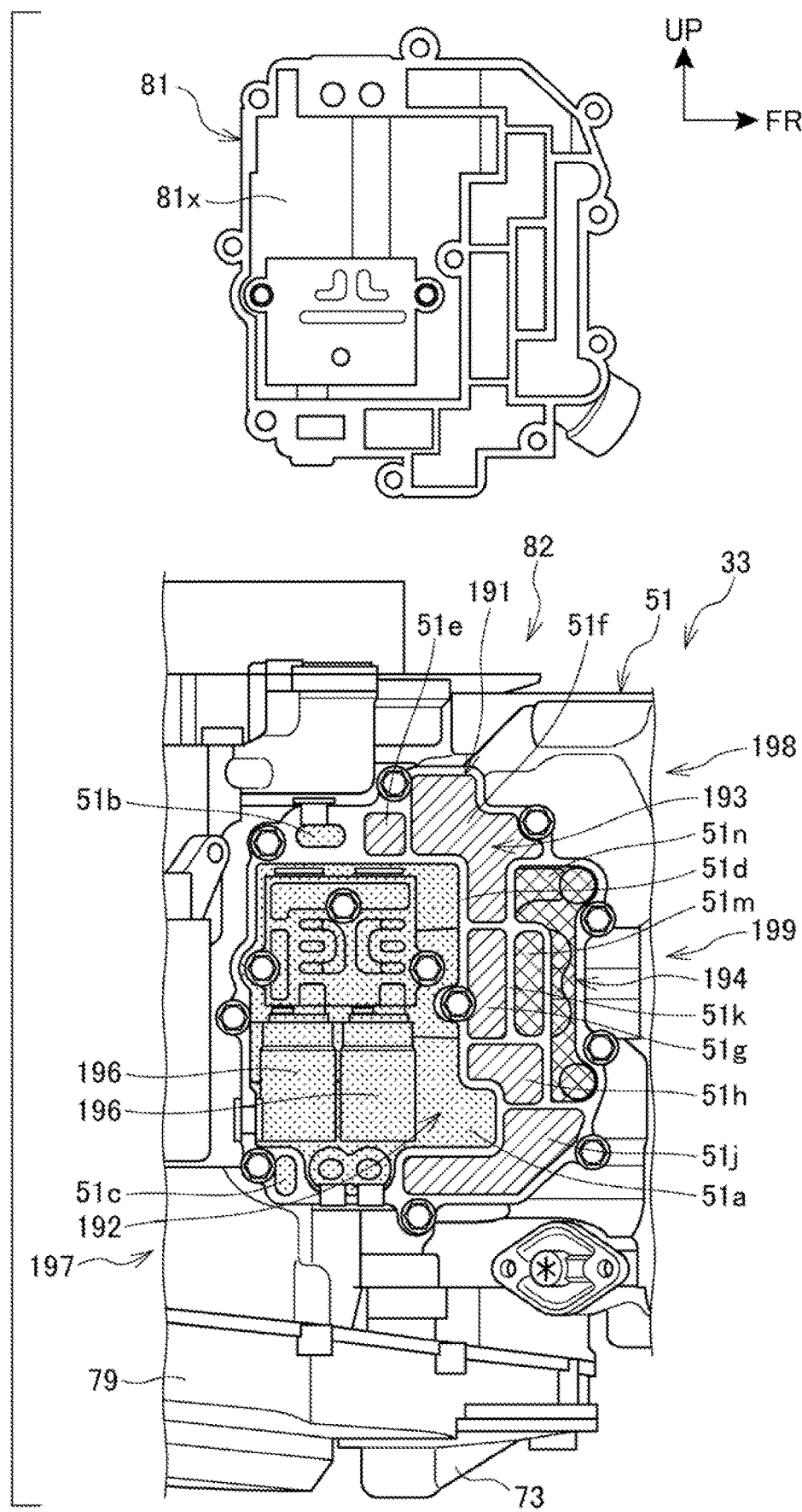
FIG. 6 is a plan view of major components, illustrating an engine upper-portion chamber of a cylinder block.

FIG. 6 is a plan view of major components, illustrating the engine upper-portion chamber 82 of the cylinder block 51.

An engine upper-portion recess 191 is formed in the upper portion of the cylinder block 51. FIG. 6 illustrates a condition in which the engine cover 81, which covers the engine upper-portion recess 191 from above, is removed from the cylinder block 51 and an inner surface 81x of the engine cover 81 faces the viewer.

The engine upper-portion chamber 82 is formed by the engine upper-portion recess 191 and the engine cover 81.

The engine upper-portion recess 191 includes an actuator chamber recess 192, a breather chamber recess 193, and a water passage recess 194.

In FIG. 6, the actuator chamber recess 192 is indicated by a plurality of dots, the breather chamber recess 193 is indicated by diagonal hatching, and the water passage recess 194 is indicated by diagonal cross-hatching.

The breather chamber recess 193 is disposed anterior in the vehicle to the actuator chamber recess 192. The water passage recess 194 is disposed anterior in the vehicle to the breather chamber recess 193.

The actuator chamber recess 192 and the engine cover 81 form an actuator chamber 197. The actuator chamber 197 is filled with lubricating oil.

The actuator chamber recess 192 includes a plurality of recesses 51a, 51b, and 51c, which communicate with each other.

Reference is made to FIGS. 5 and 6. The actuator chamber 197 houses a plurality of actuators 196. The actuators 196 control hydraulic pressure supplied to the first hydraulic chamber 144 and the second hydraulic chamber 164 of the dual clutch 78. The actuators 196 are each a solenoid that drives a valve element included in a hydraulic control valve, not illustrated. The hydraulic control valves are provided for the first hydraulic clutch 131 and the second hydraulic clutch 132, respectively, for varying the hydraulic pressures supplied to the first hydraulic clutch 131 and the second hydraulic clutch 132, respectively, using the actuators 196. The actuators 196 are provided for the first hydraulic clutch 131 and the second hydraulic clutch 132, respectively.

The hydraulic control valve for the first hydraulic clutch 131 and the hydraulic control valve for the second hydraulic clutch 132 constitute a hydraulic control device that is connected with the axial oil passage, not illustrated, and the axial oil passage 177, which are provided in the first main shaft 107, through respective oil supply passages, not illustrated.

In FIG. 6, the breather chamber recess 193 and the engine cover 81 form a breather chamber 198. The breather chamber 198 performs gas-liquid separation of blowby gas (breathing air) in the crankcase 44 and in the cylinder portion 45. The breather chamber recess 193 is adjacent to the actuator chamber recess 192 across a bulkhead 51d and includes a plurality of recesses 51e, 51f, 51g, 51h, and 51j, which communicate with each other.

The water passage recess 194 and the engine cover 81 form the water passage 199, through which coolant flows. The water passage recess 194 is adjacent to the breather chamber recess 193 across a bulkhead 51k and includes a plurality of recesses 51m and 51n, which communicate with each other. The water passage 199 communicates with a water jacket formed in each of the cylinder block 51 and the cylinder head 52.

The actuator chamber 197, the breather chamber 198, and the water passage 199 are each formed into a space independent of each other by the engine cover 81 being mounted in the engine upper-portion recess 191 in a hermetically sealed condition.

As described above, in FIG. 4, the connected or disconnected state of each of the first hydraulic clutch 131 and the second hydraulic clutch 132 is controlled individually by the abovementioned hydraulic control device on the basis of whether or not a clutch hydraulic supply device (not illustrated) supplies a hydraulic pressure. Either one of the first hydraulic clutch 131 and the second hydraulic clutch 132 is generally brought into the connected state, and the other one of the first hydraulic clutch 131 and the second hydraulic clutch 132 is brought into the disconnected state.

For example, when the transmission 47 has six shift speeds, the first hydraulic clutch 131 is connected in the first shift speed, the third shift speed, and the fifth shift speeds and the second hydraulic clutch 132 is connected in the second shift speed, the fourth shift speed, and the sixth shift speeds. As such, in the transmission 47, the first hydraulic clutch 131 and the second hydraulic clutch 132 are alternately connected or disconnected from the first shift speed to the sixth shift speed to thereby achieve gear-shifting.

When a current shift position (shift speed) is an odd-numbered shift speed (or an even-numbered shift speed), for example, the subsequent shift position is an even-numbered shift speed (or an odd-numbered shift speed). Thus, a state is created in advance in which power transmission is enabled through use of a transmission gear pair of an even-numbered shift speed (or an odd-numbered shift speed). At this time, while the first hydraulic clutch 131 (or the second hydraulic clutch 132) is in the connected state, the second hydraulic clutch 132 (or the first hydraulic clutch 131) is in the disconnected state, so that power of the engine is not transmitted to the second main shaft 108 (or the first main shaft 107) and the transmission gear pair of an even-numbered shift speed (or an odd-numbered shift speed).

When a control unit, not illustrated, thereafter determines that a shift timing is reached, the first hydraulic clutch 131 (or the second hydraulic clutch 132) is brought into the disconnected state and the second hydraulic clutch 132 (or the first hydraulic clutch 131) is brought into the connected state. Thereby, power transmission is established through the use of the transmission gear pair associated with the previously selected subsequent shift position. The foregoing arrangement enables quick and smooth gear-shifting without having a time lag or interruption of power transmission involved during gear-shifting.

Second Embodiment

Figure 7:
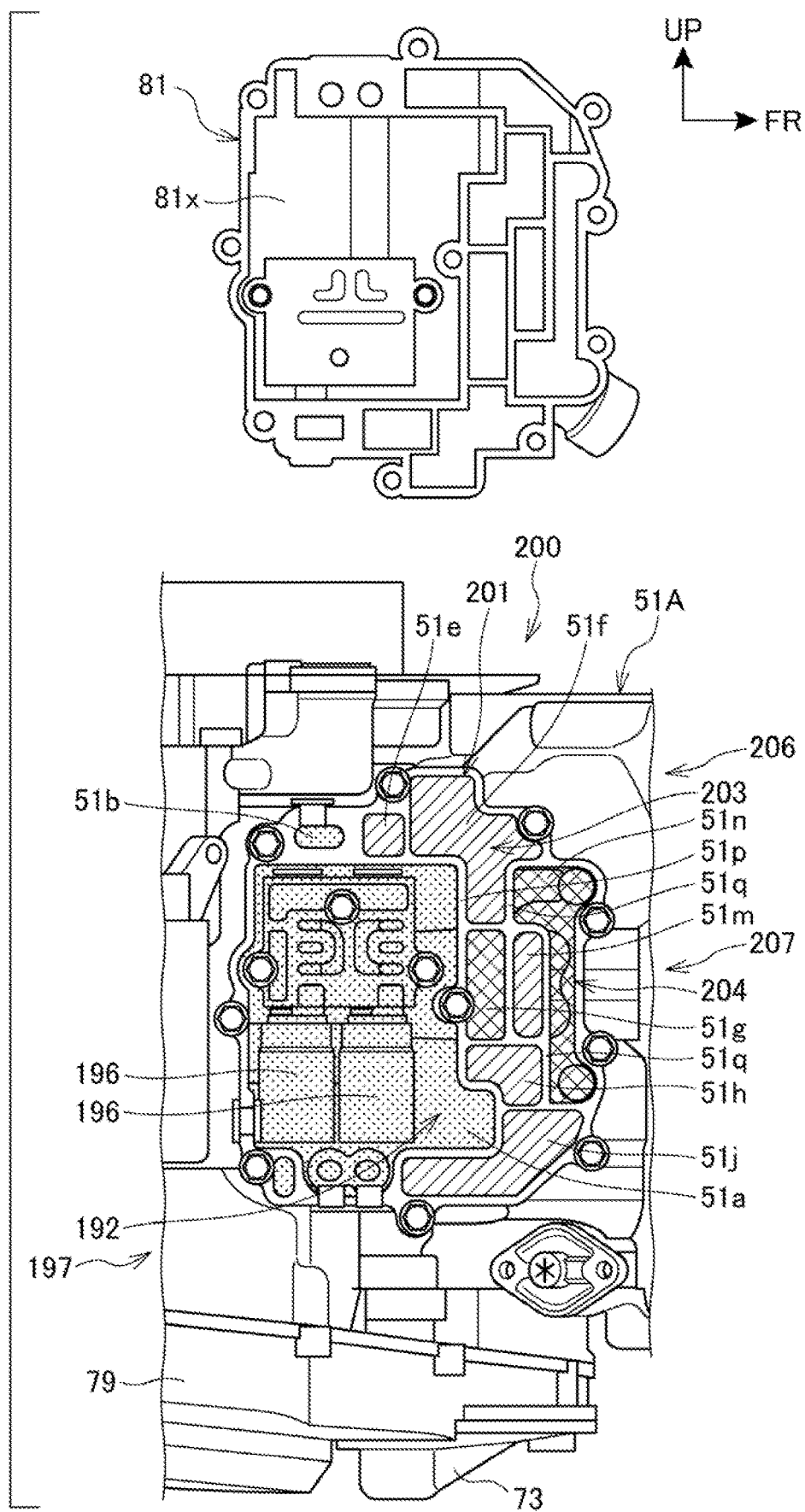
FIG. 7 is a plan view of major components, illustrating an engine upper-portion chamber of a cylinder block according to a second embodiment.

FIG. 7 is a plan view of major components, illustrating an engine upper-portion chamber 200 of a cylinder block 51A according to a second embodiment.

The cylinder block 51A has an engine upper-portion recess 201 formed in an upper portion of the cylinder block 51A. The engine upper-portion recess 201 is covered from above, which forms the engine upper-portion chamber 200.

The cylinder block 51A differs from the cylinder block 51 in the first embodiment only in the engine upper-portion recess 201.

FIG. 7 illustrates a condition in which the engine cover 81, which covers the engine upper-portion recess 201 from above, is removed from the cylinder block 51A and the inner surface 81x of the engine cover 81 faces the viewer.

The engine upper-portion recess 201 includes the actuator chamber recess 192, a breather chamber recess 203, and a water passage recess 204.

In FIG. 7, the actuator chamber recess 192 is indicated by a plurality of dots, the breather chamber recess 203 is indicated by diagonal hatching, and the water passage recess 204 is indicated by diagonal cross-hatching.

The breather chamber recess 203 and the water passage recess 204 are disposed anterior in the vehicle to the actuator chamber recess 192. The breather chamber recess 203 is divided into two in the vehicle width direction by the water passage recess 204.

The breather chamber recess 203 forms a breather chamber 206. The breather chamber 206 performs gas-liquid separation of a blowby gas in the crankcase 44 (see FIG. 3) and in the cylinder portion 45 (see FIG. 3). The breather chamber recess 203 is adjacent to the actuator chamber recess 192 across a bulkhead 51p and includes a plurality of recesses 51e, 51f, 51h, 51j, and 51m, which are partitioned from each other.

The water passage recess 204 forms a water passage 207, through which coolant flows. The water passage recess 204 is adjacent to the breather chamber recess 203 across a bulkhead 51q and includes a plurality of recesses 51g and 51n, which are partitioned from each other.

The actuator chamber 197, the breather chamber 206, and the water passage 207 are formed by the engine cover 81 being mounted in the engine upper-portion recess 201 in a hermetically sealed condition.

Reference is made to FIGS. 6 and 7. In the engine upper-portion chamber 200 in the second embodiment, as compared with the engine upper-portion chamber 82 in the first embodiment, the recess 51g is changed from a part of the breather chamber 198 to a part of the water passage 207. This arrangement results in the water passage 207 being adjacent to the actuator chamber 197, so that heat exchange can be performed between oil and coolant when a difference in temperature occurs between the oil in the actuator chamber 197 and the coolant in the water passage 207.

In addition, in the second embodiment, the recess 51m is changed from a part of the water passage 199 in the first embodiment to a part of the breather chamber 206.

As illustrated with reference to FIGS. 2, 4, and 6, the motorcycle 10 as a saddle riding vehicle includes the engine 33, as a forwardly inclined engine, the first hydraulic clutch 131 and the second hydraulic clutch 132, as the hydraulic clutches, and the actuator chamber 197.

The engine 33 includes the cylinder block 51 and the cylinder head 52, which are connected with the crankcase 44 in a forwardly inclined posture. The first hydraulic clutch 131 and the second hydraulic clutch 132 connect or disconnect a transmission path of power of the engine 33 to the transmission 47. The actuator chamber 197 houses the actuators 196, which control hydraulic pressures of the first hydraulic clutch 131 and the second hydraulic clutch 132.

In the engine upper-portion structure of the motorcycle 10, the actuator chamber 197 is disposed on the upper surface of the cylinder block 51 at a position posterior to the cylinder head 52 and anterior to the crankcase 44 in a vehicle longitudinal direction.

Through the foregoing configurations, the disposition of the actuator chamber 197 on the upper surface of the cylinder block 51 results in the actuator chamber 197 not protruding in the vehicle width direction, so that an increase in size of the engine 33 in the vehicle width direction can be prevented. Additionally, an effect on the actuator chamber 197 from, for example, flying gravel can be reduced.

As illustrated with reference to FIGS. 3, 6, and 7, the breather chamber 198 or 206, which performs gas-liquid separation of the breathing air (blowby gas) in the crankcase 44, is formed on the upper surface of the crankcase 44 or the upper surface of the cylinder block 51 or 51A. The breather chamber 198 or 206 is adjacent to the actuator chamber 197 and the breather chamber 198 or 206 and the actuator chamber 197 are closed by the engine cover 81 as a single lid member.

The foregoing configuration enables the single engine cover 81 to hermetically seal the actuator chamber 197 and the breather chamber 198 or 206. The first and second embodiments can achieve reduction in the number of man-hours, as in machining a packing surface, and the number of parts used, compared with a configuration in which a dedicated lid member is provided for each of the actuator chamber 197 and the breather chamber 198 or 206.

As illustrated with reference to FIGS. 3 and 6, the cylinder block 51 and/or the cylinder head 52 are cooled by the coolant and the thermostat 95 and the thermostat case 94 are disposed midway in a water path of the coolant. The thermostat 95 changes the water path of the coolant depending on the temperature of the coolant. The thermostat case 94 houses the thermostat 95. The thermostat case 94 (specifically, the thermostat housing pipe portion 81a) is integrated with the engine cover 81 of the actuator chamber 197.

Through the foregoing configuration, the thermostat case 94, being integrated with the engine cover 81, promotes reduction in the number of parts used.

As illustrated with reference to FIGS. 3, 6, and 7, the cylinder block 51 or 51A and/or the cylinder head 52 are cooled by the coolant and the thermostat 95 and the thermostat case 94 are disposed midway in the water path of the coolant. The thermostat 95 changes the water path of the coolant depending on the temperature of the coolant. The thermostat case 94 houses the thermostat 95. The thermostat case 94 (specifically, the thermostat housing pipe portion 81a) is integrated with the engine cover 81.

The water passage 199 or 207 serves as a connecting water path that connects a water path in the cylinder block 51 or 51A and/or the cylinder head 52 with the thermostat case 94. The water passage 199 or 207 is disposed adjacent to the breather chamber 198 or 206.

Through the foregoing configuration, because of the water passage 199 or 207 being disposed adjacent to the breather chamber 198 or 206, the breather chamber 198 or 206 may serve as a simplified heat exchanger that can reduce a high temperature of the coolant. In addition, the single engine cover 81 can function as a lid for the breather chamber 198 or 206, a lid for the actuator chamber 197, and the thermostat case 94, so that the number of parts used can be reduced.

As illustrated in FIG. 7, a part of the water passage 207 is disposed adjacent to the actuator chamber 197.

Through the foregoing configuration, when the temperature of oil in the actuator chamber 197 is high, the coolant may function as receiving the heat, so that the temperature of oil in the actuator chamber 197 can be prevented from rising inordinately.

While the present invention has been particularly described with reference to the embodiments, it will be understood that the embodiments are illustrative only and are not intended to limit the present invention, and the invention may be embodied in other specific forms without departing from the spirit or essential characteristics thereof.

For example, one possible configuration is that, in the above embodiments, at least either one of the cylinder block 51 or 51A and the cylinder head 52 illustrated in FIGS. 2, 6, and 7 has a water jacket formed thereinside to thereby be cooled by the coolant.

As illustrated FIG. 6, the breather chamber 198 is disposed on the upper surface of the cylinder block 51. This is, however, illustrative only and not limiting. The breather chamber 198 may be disposed on the upper surface of the crankcase 44.

The present invention is applicable to, not only the motorcycle 10, but also types of saddle riding vehicles other than the motorcycle 10. The saddle riding vehicles include all types of vehicles in which the occupant straddles the vehicle body, including three-wheel saddle riding vehicles and four-wheel saddle riding vehicles classified as all-terrain vehicles (ATVs) in addition to the motorcycles (including motor-assisted bicycles).

DESCRIPTION OF REFERENCE SYMBOLS

10 Motorcycle (saddle riding vehicle)
33 Engine (forwardly inclined engine)
44 Crankcase
47 Transmission
51, 51A Cylinder block
52 Cylinder head
81 Engine cover (lid member)
94 Thermostat case
95 Thermostat
131 First hydraulic clutch (hydraulic clutch)
132 Second hydraulic clutch (hydraulic clutch)
196 Actuator
197 Actuator chamber
198, 206 Breather chamber
199, 207 Water passage (connecting water path)

The invention claimed is:

1. An engine upper-portion structure for a saddle riding vehicle, comprising:
    a forwardly inclined engine including a cylinder block and a cylinder head connected in a forwardly inclined posture with a crankcase;
    a hydraulic clutch that connects or disconnects a transmission path of power of the forwardly inclined engine to a transmission; and
    an actuator chamber that houses an actuator for controlling a hydraulic pressure of the hydraulic clutch, wherein
    the actuator chamber is disposed on an upper surface of the cylinder block at a position posterior to the cylinder head and anterior to the crankcase in a vehicle longitudinal direction.

2. The engine upper-portion structure for a saddle riding vehicle according to claim 1, further comprising:
    a breather chamber disposed on an upper surface of the crankcase or an upper surface of the cylinder block, the breather chamber performing gas-liquid separation of breathing air in the crankcase, wherein
    the breather chamber is adjacent to the actuator chamber, and
    the breather chamber and the actuator chamber are closed by a single lid member.

3. The engine upper-portion structure for a saddle riding vehicle according to claim 2, wherein
    the cylinder block and/or the cylinder head are cooled by a coolant,
    a thermostat and a thermostat case are disposed midway in a water path of the coolant, the thermostat changing the water path of the coolant depending on a temperature of the coolant and the thermostat case housing the thermostat,
    the thermostat case is integrated with the lid member, and
    a connecting water path is disposed adjacent to the breather chamber, the connecting water path connecting a water path in the cylinder block and/or the cylinder head with the thermostat case.

4. The engine upper-portion structure for a saddle riding vehicle according to claim 3, wherein
    a part of the connecting water path is disposed adjacent to the actuator chamber.

5. The engine upper-portion structure for a saddle riding vehicle according to claim 1, wherein the cylinder block and/or the cylinder head are cooled by a coolant,
a thermostat and a thermostat case are disposed midway in a water path of the coolant, the thermostat changing the water path of the coolant depending on a temperature of the coolant and the thermostat case housing the thermostat, and
the thermostat case is integrated with a lid member of the actuator chamber.

\* \* \* \* \*